United States Patent [19]

Cheneviere et al.

[11] Patent Number: 5,788,756
[45] Date of Patent: Aug. 4, 1998

[54] PAVING COMPOSITION/BUILDING COMPOSITION INCLUDING A FILM FORMING BITUMEN IN-WATER MIXED EMULSION

[75] Inventors: Pascal Cheneviere, Pau; Jean-Claude Fabre, Charenton Le Pont; Luc Navascues, Paris, all of France

[73] Assignee: CECA S.A., Puteaux, France

[21] Appl. No.: 520,511

[22] Filed: Aug. 28, 1995

Related U.S. Application Data

[63] Continuation of Ser. No. 120,368, Sep. 14, 1993, abandoned.

[30] Foreign Application Priority Data

Sep. 14, 1992 [FR] France ................... 92 10908

[51] Int. Cl.⁶ .................................... C08L 95/00
[52] U.S. Cl. ............... 106/277; 106/281.1; 106/DIG. 7; 106/283; 252/311.5; 428/403; 404/17
[58] Field of Search ................. 106/277, 281.1, 106/273.1, DIG. 7, 283; 252/311.5; 428/402, 403; 404/17

[56] References Cited

U.S. PATENT DOCUMENTS

| 4,762,565 | 8/1988 | Graf | 106/277 |
| 5,114,483 | 5/1992 | Graf | 106/281.1 |

FOREIGN PATENT DOCUMENTS

| 2623219 | 5/1989 | France . |
| 1941688 | 2/1971 | Germany . |
| 48-75483 | 10/1973 | Japan . |
| 443666 | 4/1936 | United Kingdom . |
| 2255978 | 11/1992 | United Kingdom . |
| 88/03157 | 5/1988 | WIPO . |
| WO93/09295 | 5/1993 | WIPO . |

OTHER PUBLICATIONS

Anil K. Mehrotra, "Mixing Rules for Predicting the Viscosity of Bitumens Saturated With Pure Gases", The Canadian Journal of Chemical Engineering. vol. 70, Feb. 1992, pp. 165–172.

Anil K. Mehrotra, "A Generalized Viscosity Mixing Rule for the Blends of Bitumen, Bitumen Fractions and Liquid Diluents", Tar, Sand and Oil Upgrading Technology. vol. 87, No. 282, pp. 36–42. (date unknown).

P. Goulard, "Technologie de Fabrication des Emulsions de Bitume", Bull. Liaison Labo. P & Ch., Special W, Jun. 1974.

Directive, Sep. 1969.

Directive, Sep. 1974.

Jean–Francois Lafon, "Enrobes a froid traites a l'emulsion de bitume repandus en couches continues Enrobes denses et enrobes ouverts", Bull. Liaison Labo. P & Ch., Mar.–Apr., 1985, pp. 81–93.

Primary Examiner—Mark L. Bell
Assistant Examiner—Michael Marcheschi
Attorney, Agent, or Firm—Burns, Doane, Swecker & Mathis, L.L.P.

[57] ABSTRACT

Film-forming bitumen-in-water mixed emulsions comprising intimate immixture of (i) an oil-in-water emulsion of a hard bituminous material and (ii) an oil-in-water emulsion of a soft bituminous material, are well suited for the production of storage-stable coated particulates, notably cold dense building and paving materials such as aggregate and gravel, useful for the construction of, e.g., road and highway surfaces via compaction thereof.

11 Claims, 2 Drawing Sheets

PAVING COMPOSITION/BUILDING COMPOSITION INCLUDING A FILM FORMING BITUMEN IN-WATER MIXED EMULSION

This application is a continuation of application Ser. No. 08/120,368, filed Sep. 14, 1993, now abandoned.

BACKGROUND OF THE INVENTION

1. Field of the Invention

The present invention relates to novel hard/soft mixed bituminous emulsions, to cold-process dense bituminous coated materials and to emulsion-bound road paving materials and gravels exhibiting a particularly attractive storage stability.

2. Description of the Prior Art

In the field of highway and building construction and similar endeavors, the term "coated materials," or mixes, refers to materials used for the construction and maintenance of pavements and the surfacings thereof, as well as the surfacing of storage areas, parking lots, and the like. These materials are typically produced from aggregates and black binders, bitumens, asphalts, or tars, which may, as the case requires, be modified by adding solvents or polymers thereto. They are normally divided into two categories, depending on their coating technique, i.e., hot-process and cold-process coated materials, the former being manufactured, as their name indicates, from materials heated to relatively high temperatures.

Cold-process coated materials were the first to be used as black road surfacings; however, they were very widely soon replaced by hot-process materials produced at large stationary (fixed) or mobile manufacturing facilities. Nevertheless, cold-process coated materials possess obvious properties permitting economy of manufacture, since their constituents do not all have to be heated to high temperature to allow coating, and because their application does not entail strict adherence to spreading and compaction temperatures. However, they do require that their constituents be judiciously selected and do not lend themselves to use in formulae requiring high levels of compactness. In addition, they are either very sensitive to deformation under the rigors of traffic when they incorporate fluxed binders, or do not possess adequate storage capabilities when manufactured using pure binders. The lack of technical sophistication regarding their use has been an obstacle to their application at public works sites. Despite undeniable properties, they have remained marginal materials.

Among cold-process coated materials, a distinction is commonly made between cold open-graded coated materials, whose percentage of voids content is greater than 15%; cold semi-dense coated materials, whose percentage of voids content ranges from 10% to 15%; and cold dense coated materials, whose voids content accounts for less than 10%. As regards the latter, with which the present invention is most concerned, it is not possible to use fluxed binders with light solvents. The evaporation of the solvent would be impaired because of the high level of compactness of the coated material when deposited, inevitably resulting in the pronounced formation of ruts caused by vehicular traffic. Accordingly, attempts have long been made to produce them from emulsions of non-fluxed black binders using light solvents, preference being given, as regards medium- or low hardness binders, to those produced from low-viscosity topped residues, in contradistinction to those reformulated from viscous residues and oils.

The manufacture of emulsion-bound coated materials and of emulsion-bound gravel appears to mandate a compromise which cannot be attained. Indeed, a proper coating must first be produced, that is, at a point in time necessarily preceding deposit, the emulsion must be separated out into a binder which will have coated virtually all of the surface area of the aggregates, and into water, which will ultimately be drained away from the compacted surfacing. There thus exists, on the one hand, a problem centered about the minimum stability of the coating emulsion relating to the high specific surface area of the aggregates, and, on the other, a problem emanating from the time-limit for effecting the coating and deposit operations, all of which occur at ambient temperature. The viscosity of the binder at that temperature must be relatively high in order to permit the compacted coated material to properly withstand the formation of ruts caused by traffic. This condition is incompatible with the requirement that the viscosity of the binder be sufficiently low to ensure the handling capacity of the system, both during mixing and when the materials are reused after possible storage time using machines which deposit the materials and compact them.

The solutions according to prior art can be applied only to very specific special cases. For example, there have been instances of open-graded coating procedures utilizing two emulsions in succession, such as disclosed in U.S. Pat. No. 5,114,483 or in International Application No. 88/03157. Techniques have also been described for the separate coating of the fine and coarse fractions of the granulometry (see, for example, French Patent No. FR-A-2623219, which suggests coating by emulsion the 2/D mm portion of the granulometry, then completing the formula by adding the %2 mm fraction, preliminarily coated, to the mixer; or Application No. PCT WO9309295, which recommends coating, using the soft bitumen emulsion, the mixture of the large-size elements preliminarily coated with a hard bitumen emulsion and of the fine constituents). These processes are difficult to carry out with precision, and their transposition to the manufacture of cold-process dense coated materials using a fluxed binder as the base yields products whose storage capability is illusory. Thus, current practice includes "LEBON" coated materials, dense cold-process coated materials used for repairs (for filling potholes) or the execution of small-scale work, which have no storage capacity and which, as such, are produced using a non-fluxed bitumen emulsion in a machine incorporating its own mixer and which operates in immediate proximity to the tasks to be accomplished (see J. -F. Lafon, "Enrobés à froid traités à l'émulsion de bitume répandus en couche continue," ["Cold Coated Materials Treated with a Bituminous Emulsion and Spread in a Continuous Layer"], Bull. Liaison Labo. P. & Ch., 136, March–April 1985, Ref. 2982).

SUMMARY OF THE INVENTION

The present invention entails a property first reported by P. Lechter (GB 443,666) (but whose application to storable cold dense coated materials and similar products is conspicuously alien to this art) in respect of certain bituminous or similar emulsions. It is known to this art that breaking an emulsion releases a binding agent which does not immediately attain its intrinsic cohesiveness. Such "breaking" is a dynamic phenomenon which causes the bitumen to be transformed from a dispersed state to that of a continuous film, by virtue of the fact that the particles are spaced closer together, followed by their coalescence, during which a determinate amount of water is momentarily entrapped in the mass of the binding agent, then by the expulsion of this watery phase. During this breaking, the viscosity of the system, initially comparable to that of water, is transformed more or less rapidly, into the viscosity of the final binding agent. This phenomenon is taken into account during the manufacture of emulsion-based surface coatings (road-surfacing coatings known as "fine-gravelling," such as to determine when the project will be opened to traffic, the final increase in cohesiveness being critical to the strength of the road surface. On the other hand, when emulsion-bound coated material are produced, the increase in cohesiveness is sufficiently great during the first moments of the operation to cause the mass of the material to set, a phenomenon which severely limits the time-limit for application, and sometimes even blocks or clogs the mixers.

Briefly, the present invention features the unexpected discovery that, when the bituminous emulsion is a mixed emulsion incorporating two black binders of different viscosities, the binder formed by spontaneously breaking this emulsion possesses, surprisingly, a particular viscosity when deposited lower than could have been expected for the mixture of the two black binders.

DESCRIPTION OF THE DRAWINGS

FIG. 1 illustrates a bituminous emulsion. The dispersed binder appears in the form of individual spheres. This figure is not typical of an emulsified type of binder.

FIG. 2 is an image of a film produced by spontaneously breaking a hard bituminous emulsion. It shows flocculation of the particles without coalescence, thereby causing them to assume polyhedral shapes.

FIG. 3 is a photomicrograph of a film produced by rupture of a soft bitumen, the particles have completely lost their individuality, although wide gaps in the film still recount the recent history of their coalescence.

FIG. 4 is a photomicrograph of the film produced by breaking an emulsion according to the invention. It shows individualized spherical particles entrapped in a mass without apparent structure. This structure of the film obtained by spontaneous rupture of the emulsion according to the invention, in which the spherical particles are uniquely composed of hard bitumen and the non-crystalline binder is composed mainly of soft bitumen, is an observable characteristic thereof. It is this structure which may justifiably be deemed to produce the initial state of low overall viscosity of the binder. This film progresses spontaneously, but slowly, toward the expected viscosity.

DETAILED DESCRIPTION OF PREFERRED EMBODIMENTS OF THE INVENTION

Figure 1:
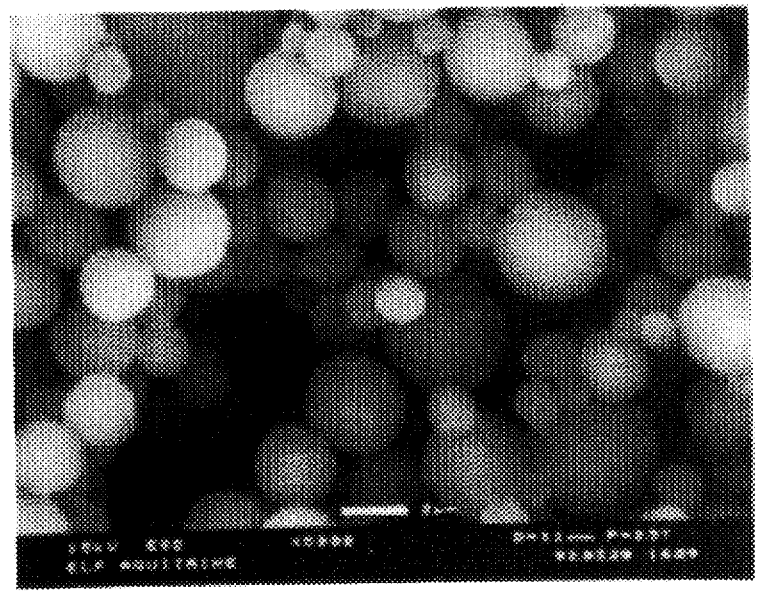
FIGS. 1–4 are photomicrographs.
Figure 2:
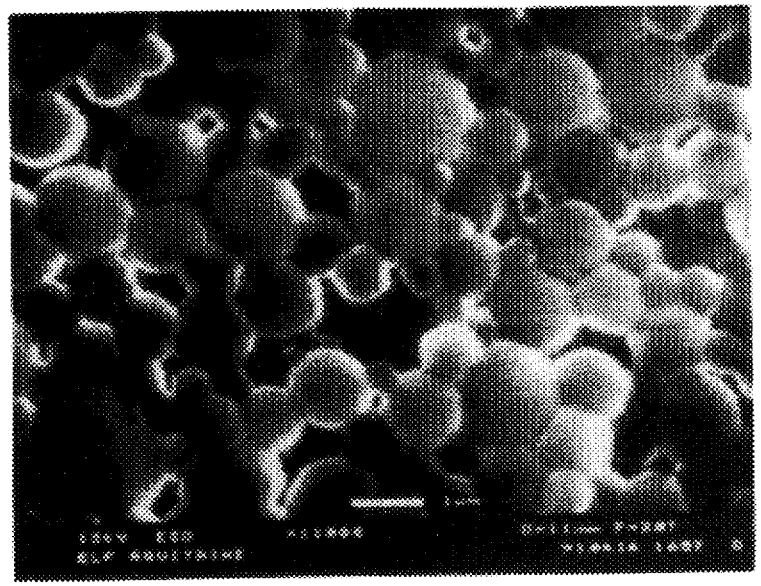
Figure 3:
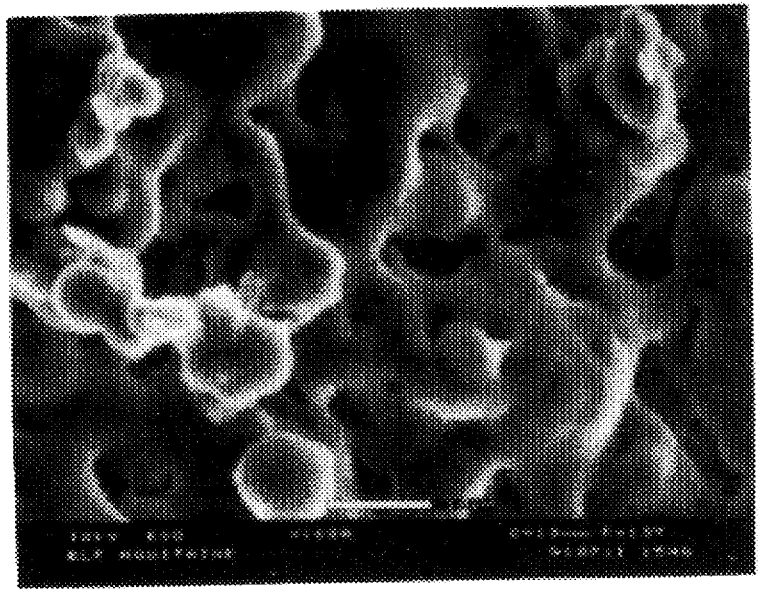
Figure 4:
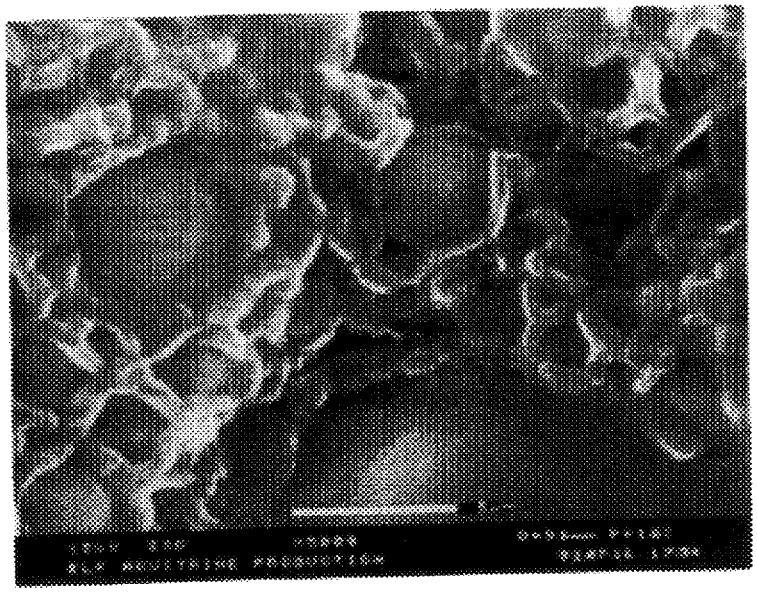

The present invention thus features a process for the manufacture of dense, storable coated materials and of emulsion-bound gravels by cold coating with mixed emulsions containing at least two black binders (and secondarily, their clear or colored equivalents for special public works projects) having different viscosities. One of the binders is a hard binding material, and the other is soft, their proportions being determined in accordance with the known laws governing the viscosity of such mixtures. In greater detail, it has now been considered, pursuant to the known conventions of this art, that the group of hard bitumens includes bitumens having a penetrability of 40–50 or less, and that soft bitumens are those having a penetrability of 180–220 or higher.

In this respect, a bituminous emulsion equivalent to a bitumen having standard penetrability of 80–100 can be produced from a hard bitumen 20–30 or 40–50 and a soft bitumen having a penetrability of 180–220. In general, to increase the period during which the dense coated material can be worked, it is preferable to increase the proportion of soft binder, rather than increasing the viscosity differential between the two binders constituting the mixture. It transpires, however, that a very high proportion of soft binder yields coated materials whose properties under storage are not ideal. An acceptable compromise can be established using mixed emulsions whose initial soft binder content is approximately 15% to 45%, in which the ratio of the viscosity of the hard binder to that of the soft binder does not exceed $10^3$.

The technique used to compute the proportions to be observed is explained in detail below in the examples. This method restricts the selection of hard binders used in the invention to binders having standard penetrability equal to, or less than, 70, and the selection of soft binders to binders whose penetrability is equal to, or greater than, 180. Coating is carried out under normal conditions, and the coated product obtained is, at this stage, a soft bitumen coated material. Under the kneading action exerted by the multi-cylinder or -tire rollers, the coated product assumes the properties of a hard bituminous coated material.

The cationic bituminous emulsions, the formulation of which is well known to this art, are the preferred emulsions according to the invention, because the breaking of same is attained during ordinary mixing and because there is, subsequently, no longer any problem of loss of binder resulting from the drying of the unbroken emulsion during storage or transport of the coated material at hand; and also because the final properties of the coated material, in particular its resistance to loss of coating when deposited, are appreciably superior to those of any other type of emulsion. However, it is obvious that the invention is also applicable to mixed anionic or non-ionic emulsions when the quality of the aggregates and the coating technique permit the use thereof.

The mixed emulsions according to the invention are produced quite simply by mixing, in suitable proportions, a hard bituminous emulsion and a soft bituminous emulsion. It is also possible, although somewhat more complicated, to use the emulsion of a binder and to recycle it as a watery or aqueous phase in the emulsion mill, such as to enrich it with the other type of binder.

The cold coated materials that can be produced according to the invention include cold dense coated materials in the strict sense, whose aggregates fall within the ambit of the spindle types corresponding to the semi-granular formulae for hot coated materials and the compositions known as emulsion-bound gravels. The spindle types for hot coated materials are specified in the "Directive pour la Réalisation des Couches de Surface de Chaussées en Béton bitumineux" ["Directive for Manufacture of Road Surface Layers Made of Asphalt Concrete"], SETRA-LCPC, 1969. They correspond to the following composition:

(a) Fines: 6%–9%

(b) passing through at 2 mm: 35%–45%

(c) passing through at 6 mm: 60%–70%

The emulsion-bound gravels, also according to the present invention, are specified in the "Directive pour la Réalisation des Assises de Chaussées en Graves-Emulsions" ["Directive for the Manufacture of Road Layers Made of Emulsion-Bound Gravels"], SETRA-LCPC, 1974. These have been found similar to cold dense coated materials, because they are produced using very similar techniques and because their percentage of voids content is very low (<15%).

The cold dense coated materials and the emulsion-bound gravels obtained by coating gravel using the mixed emulsion incorporating hard and soft bitumens obviously are also featured hereby.

The manufacture of open-graded or semi-open-graded coated materials using mixed hard and soft bituminous emulsions too is within the ambit of this invention. Similarly, the use of these mixed emulsions for the production of surface coatings or pavings are encompassed by the invention to improve the wetting of the fine gravels by the binder film and the formation of the mosaic during the first roller compactions.

In order to further illustrate the present invention and the advantages thereof, the following specific examples are given, it being understood that same are intended only as illustrative and in nowise limitative.

EXAMPLES

In said examples to follow, each of the six emulsions indicated therein contained 60% residual binder. These were produced using an EMULBITUME turbine, employing a polyamine emulsifying agent (POLYRAM S marketed by CECA, SA) in a proportion of 6 kg/ton of emulsion, the pH of the aqueous phase being adjusted to 2 by adding HCl. The conditions determining emulsion formation were those normally applied by one skilled in this art; in particular, the temperature of the binder was the so-called 200 centistoke "equiviscosity" temperature ($2m^2.s^{-1}$), and the temperature of the aqueous phase was derived from the so-called "rule of the 200" (see P. Goulard, "Technologie de fabrication des émulsions de bitume" ["Technique for Manufacture of Bituminous Emulsions"], *Bull. Liaison Labo. P. & Ch., Special W,* June 1974). The binders used in the six emulsions had the following characteristics:

TABLE I

| Emulsion No. | Initial Penetrability[1] | Viscosity[2] of the Binder (pa · s) | Category[3] |
|---|---|---|---|
| E1 | 20–30 ELF FEYZIN | 96,000 | H |
| E2 | 40–50 ELF FEYZIN | 60,000 | H |
| E3 (reference) | 80–100 SHELL-BERRE | 38,000 | Intermediate |
| E4 | 80–220 EXXON | 7,000 | S |
| E5 | <600[4] ELF FEYZIN | 270 | S |
| E6 | <1000[5] | 0,974 | S |

[1]According to AFNOR NFT-66004 standard.
[2]Measurement made, using an imposed stress rheometer (frequency = 1 Hz, T = 30° C.). The correspondence between penetrabilities and the viscosity expressed in Pascal seconds was solely experimental.
[3]"H": "Hard"; and "M": "soft"
[4]This binder was an atmospheric residue which was very slightly viscous.
[5]Binder E6 was not a bituminous binder, but a silicone oil. Its viscosity was comparable to that of a fluxed bitumen-type, but not volatile, flux (cutback 0/1). It permitted supplementing the examples by demonstrating an extreme case of viscosity.

The mixed emulsions were formulated in such manner that the total residual binder had a penetrability of 80/100, which is acknowledged to be the best adapted for the production of upper road layers. To this end, the rule of mixture viscosity according to A. K. Mehrotra was observed (see "A Generalized Viscosity Mixing Rule for Blends of Bitumen, Bitumen Fractions, and Liquid Diluents,: AIChE Symposium Series, No. 282, Vol. 87, pp. 36–42, or "Mixing Rules for Predicting the Viscosity of Bitumens Saturated with Pure Gases," *Canadian Journal of Chemical Engineering,* Vol. 70, February 1991, pp. 165–172):

$$V=V_M{}^{\alpha R}.V_D{}^{1-\alpha R}$$

wherein V is the viscosity of the mixture of α% soft binder having viscosity $V_M$ and of 1–α% hard binder having viscosity $V_D$. For purely bituminous mixtures, the coefficient R was selected equal to 0.75; for mixtures with silicone oil, this coefficient R was selected equal to 0.55.

The emulsions indicated in the examples were as follows:
80/100 bituminous emulsion E3 (reference)
Emulsion E7 composed of 55% E1 and 20% E5,
Emulsion E8 composed of 80% E1 and 20% E5,
Emulsion E9 composed of 85% E1 and 15% E6,
Emulsion E10 composed of 88% E2 and 12% E5,
Emulsion E11 composed of 90% E2 and 10% E6.

The coated materials set forth in Examples 1 to 3 were cold dense coated materials in the strict sense, whose granulometric assay was that of a hot semi-granular coated material.

The corresponding granulometric composition was obtained by mixing three granular fractions in the following proportions: 40% of 0/2, 25% of 2/6, and 35% 6/10 for Meilleraie diorite and Vignats quartzite. 300 grams of these dry aggregates (24 hours at 80% C) were contacted with 30 grams of bituminous emulsion in a mixer for three minutes, in order to provide a satisfactory coating.

The coated product set forth in Example 4 was an emulsion-bound gravel whose composition is reported therein.

The tests reported in the examples were as follows:
Rheological test to evaluate the increase in cohesiveness of the binder film produced by breaking the mixed emulsion The viscosity of an emulsion film having a thickness of 200 μm was measured over time using an imposed stress rheometer. To this end, 250 microliters of emulsion were placed on the measuring plane of the rheometer, and the movable shear device, in this case a perforated circular pellet 2 cm in diameter, automatically came to rest 200 μm from this plane, thus creating an airgap having well-defined dimensions, filled first by the emulsion, then by the binder film resulting from breaking the emulsion and from the progressive elimination of water through the movable device. The movable device of the apparatus was driven in an oscillating motion which it transmitted to the binder film. The resulting deformation was recorded, and the rheological properties of the material were calculated. This measurement made it possible to determine the viscosity of the film and its change over the time period of the test (four hours). Measurements were taken at 30° C. and at 40% relative humidity and permitted evaluation of the cohesiveness or "workability" of the deposited film. After four hours of aging, the film was "compacted," and its viscosity was once again measured using the rheometer. This compression can be effected mechanically by subjecting the emulsion film to vertical crushing action accompanied by tangential shear action produced by applying, for about two minutes to the movable shear device, a load of approximately one kilogram and by causing it, simultaneously, to rotate at the speed of one revolution per minute. A manual procedure can also be employed which has proved just as reliable and reproducible, by crushing the film with the flat surface of a knife and imparting a rotating motion thereto. The ratio of the viscosity of the film after compaction to the viscosity of the film at four hours enables characterizing the increase in cohesiveness resulting from compaction.

Test of the workability of the cold dense coated material

Immediately after coating, the coated material was placed in a vertical cylinder (inner diameter: 5 cm; height: 8 cm) allowing slow evaporation because of several orifices distributed over its edges. It was loaded with a piston which applied an axial pressure of 50 kPa and simulated compaction occurring spontaneously at the core of a pile of coated materials. The entire test was carried over at ambient temperature of 21° C., hygrometry: 40%. The coated material cores (approximately 8 cm in length), which were obtained after 1.5, 4, or 16.5 hours, respectively, of storage under pressure, were ejected with care, and were then placed horizontally on the lower plate of the press and subjected to diametral crushing at the speed of 2 mm/minute. Resistance to crushing was recorded.

Mechanical performance of the cold dense coated material

This test was the simple test of compression of bituminous coated materials, designated the "Duriez test," for which reference is made to the official operation method, published by Editions Dunod, June 1979. This test entailed the determination of three magnitudes: (1) resistance to compression; (2) the immersion-compression ratio; and (3) compactness. The specifications normally selected for cold dense coated materials having a total water content of 7%, as well as a mineral framework and a bitumen 80–100 content similar to that of hot coated materials (see the aforementioned 1969 LCPC-SETRA Directive) were as follows:

(1) Resistance to compression at 18° C.: $Rc > 45.10^5$ Pa;
(2) Ratio of the dry resistance to compression to resistance to compression after immersion, designated the "immersion-compression ratio," permitting assessing the damage caused by water to the mixture: $I/C > 0.7$;
(3) Compactness (LCPC) $>90\%$.

EXAMPLE 1

This example illustrates the change in viscosity of the binder films obtained by breaking the mixed emulsion. The results are reported in Table II below:

TABLE II

Viscosity (Pa · s) Compared Among Films Produced By Breaking The Emulsions:

| Emulsion No. | Viscosity at 4 hours | Viscosity after "compaction" measured | expected | Viscosity increase |
|---|---|---|---|---|
| E3 | 27,800 | 35,230 | 38,000 | 1.26 |
| E7 | 19,020 | 36,100 | 39,600 | 1.89 |
| E8 | 14,460 | 35,750 | 38,000 | 2.47 |
| E9 | 22,650 | 34,100 | 37,100 | 1.5 |
| E10 | 19,800 | 36,400 | 37,000 | 1.84 |
| E11 | 28,320 | 30,210 | 32,700 | 1.06 |

All of the viscosities of the binders obtained by a degree of mechanical working of the film tend toward 38,000 Pa.s, a value expected for a bitumen recomposed such as to provide a 80–100 product. However, those which were measured on the binder obtained by spontaneously breaking the emulsion diverge to a greater or lesser degree, the divergence being especially pronounced for mixtures of hard and soft bitumens.

EXAMPLE 2

The example illustrates cohesive setting of the coated material during storage under pressure. The interpretation of the curves corresponding to the diametral crushing of the coated material cores of Meilleraie diorite and of Vignats quartzite is provided in Table III below, which reports the resistances to diametral compression expressed in bars ($10^5$ Pascals). The materials coated with Emulsion No. 3 are given for purposes of comparison.

TABLE III

Change in the Cohesiveness of the Dense Coated Materials During storage:

| Emulsion No. | Meilleraie storage (hours) | | | Vignats storage (hours) | | |
|---|---|---|---|---|---|---|
| | 1 | 4 | 16.5 | 1 | 4 | 16.5 |
| E3 | 3 | 5.25 | 9 | 0.35 | 1.38 | 5.5 |
| E7 | 1 | 1.15 | 1.75 | 0 | 0.58 | 1.38 |
| E8 | 0 | 1.25 | 1.38 | 0 | 0 | 0.38 |
| E9 | 1.5 | 2.75 | 2.88 | 0 | 0.75 | 2 |
| E10 | 1.25 | 1.5 | 2.5 | 0 | 0.85 | 1.25 |
| E11 | 1.5 | 2.25 | 3 | 0 | 0.88 | 1.75 |

It was determined that cohesive setting during storage was strongly influenced by the technique employed to produce the binder. Coated materials produced using purely bituminous binders follow fairly well, in that regard, the viscosity characteristics reported in the preceding test.

EXAMPLE 3

In this example the quality of the cold dense coated materials was evaluated by means of the Duriez test. The coated materials were produced by coating Meilleraie diorite and Vignats quartzite with emulsion and molding same in Duriez molds immediately after coating.

The results of this test are reported in Table IV below, which indicates the values of resistance to compression in bars ($10^5$ Pascals). Emulsion No. 3 was considered as the reference (comparison) emulsion. The coated materials produced using Emulsion No. 3 were for purposes of comparison.

TABLE IV

Duriez Properties of the Coated Materials:

| Emulsion No. | Meilleraie | | | Vignats | | |
|---|---|---|---|---|---|---|
| | Rc | I/C | C % | Rc | I/C | C % |
| E3 | 64 | 0.82 | 91.5 | 52 | 0.84 | 91.8 |
| E7 | 69 | 0.85 | 91.8 | 57 | 0.83 | 92.1 |
| E8 | 65 | 0.81 | 92.1 | 51 | 0.81 | 92.5 |
| E10 | 64 | 0.83 | 91.9 | 53 | 0.84 | 91.2 |
| E11 | 57 | 0.78 | 91.3 | 48 | 0.8 | 91.5 |

This table evidences that the final properties of the coated materials were insensitive, apart from the dispersion of the results, to the technique used to produce the compositions having the same viscosity which comprise the binding agents of these coated materials.

EXAMPLE 4

The coated material in this example was of the emulsion-bound gravel type. The corresponding granulometric composition was obtained by mixing three granular fractions in the following proportions: 60% of %, 15% of %10, and 15% of 19/14 Meilleraie diorite. Emulsion E12, produced in accordance with the mixing rule previously described, comprised 50% of Emulsion E2 and 50% of Emulsion E5, in order to obtain a final residual binding material having a penetrability of 180–200. 300 grams of these dry aggregates (24 hours at 80° C.) were contacted with 25.5 grams of bituminous emulsion in a mixer for three minutes, in order to obtain satisfactory coating (residual binder=4.8%).

All of the tests described in the preceding examples were carried out using Emulsion E12 and were compared with 180–220 bitumen-based Emulsion E4, which was the reference emulsion. The tests included:

(a) the rheological test for assessing the increased cohesiveness of the binder film obtained by breaking the mixed emulsion (Table V);

(b) the test for change in cohesiveness of the emulsion-bound gravel during storage (Table VI);

(c) the Duriez properties of the emulsion-bound gravel (Table VII).

TABLE V

Comparison of Viscosities (Pa · s) of Films Produced By Breaking the Emulsions:

| Emulsion No. | Viscosity at 4 hours | Viscosity after "compaction" | | Viscosity increase |
|---|---|---|---|---|
| | | measured | expected | |
| E12 | 3,700 | 6,700 | 7,000 | 1.8 |
| E4 | 6,580 | 6,800 | 7,000 | 1.04 |

TABLE VI

Change in the Cohesiveness of an Emulsion-Bound Gravel During storage:

| Emulsion No. | Cohesiveness (kg) after storage (hours) | | |
|---|---|---|---|
| | 1 | 16.5 | 1 |
| E12 | 0 | 1.2 | 0.35 |
| E4 | 1.8 | 6 | 0 |

TABLE VII

Duriez Properties of a Coarse Gravel Emulsion:

| Emulsion No. | Meilleraie | | |
|---|---|---|---|
| | Rc* | I/C | C % |
| E12 | 25 | 0.85 | 88 |
| E4 | 28 | 0.77 | 86 |

*Resistance in bars.

These "Duriez" properties satisfy the requirements of the Emulsion-Based Gravel Directive (cited hereinbefore).

These results confirmed the advantages attained by using a mixed emulsion according to the invention:

(i) Gain of cohesiveness under compaction (Table V), (ii) Gain in workability over time (Table VI), (iii) Good mechanical strength of the coated materials and I/C ratio indicate improved water resistance (Table VII), and (iv) Satisfactory final compactness.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A workable film-forming bitumen-in-water mixed emulsion comprising intimate immixture of (i) an oil-in-water emulsion of a hard bituminous material and (ii) 15–45 wt. % of an oil-in-water emulsion of a soft bituminous material.

2. The film-forming mixed bituminous emulsion as defined by claim 1, said hard bituminous material having a standard penetrability of 70 or less, and said soft bituminous material having a standard penetrability of 180 or greater.

3. The film-forming mixed bituminous emulsion as defined by claim 2, said hard bitumen having a standard penetrability of 50 or less, and said soft bituminous material having a standard penetrability of 180 or greater.

4. The film-forming mixed bituminous emulsion as defined by claim 2, having a standard penetrability on the order of 80 to 100.

5. The film-forming mixed bituminous emulsion as defined by claim 1, wherein said mixed emulsion has a ratio of viscosity of said hard bituminous material to viscosity of said soft bituminous material of at most $10^3$.

6. The film-forming mixed bituminous emulsion as defined by claim 2, further comprising a cationic emulsifying agent.

7. A storage-stable paving composition comprising a particulate paving material coated with the workable film-forming mixed emulsion as defined by claim 1.

8. The storage-stable paving composition as defined by claim 7, said paving material comprising aggregate.

9. The storage-stable paving composition as defined by claim 7, said paving material comprising gravel.

10. A road surface compacted from the paving composition as defined by claim 7.

11. A storage-stable building composition comprising a particulate building material substrate coated with the workable film forming mixed emulsion as defined by claim 1.

* * * * *